US007507694B2

(12) United States Patent
Shumway et al.

(10) Patent No.: US 7,507,694 B2
(45) Date of Patent: *Mar. 24, 2009

(54) SURFACTANT-FREE EMULSIONS AND METHODS OF USE THEREOF

(75) Inventors: William W. Shumway, Houston, TX (US); Kenneth W. Pober, Houston, TX (US); Jeff Kirsner, Friendswood, TX (US)

(73) Assignee: Halliburton Energy Services, Inc., Duncan, OK (US)

(*) Notice: Subject to any disclaimer, the term of this patent is extended or adjusted under 35 U.S.C. 154(b) by 288 days.

This patent is subject to a terminal disclaimer.

(21) Appl. No.: 10/799,810

(22) Filed: Mar. 12, 2004

(65) Prior Publication Data

US 2005/0202977 A1 Sep. 15, 2005

(51) Int. Cl.
*C09K 8/64* (2006.01)
*C09K 8/70* (2006.01)

(52) U.S. Cl. .................. 507/221; 507/118; 507/129; 507/136; 507/138; 507/143; 507/239; 507/244; 507/248; 507/261; 507/263; 507/265; 507/267; 507/268; 507/270; 507/271

(58) Field of Classification Search .................. None
See application file for complete search history.

(56) References Cited

U.S. PATENT DOCUMENTS

| | | | | | |
|---|---|---|---|---|---|
| 2,360,992 | A | * | 10/1944 | Weiss | 507/137 |
| 3,017,350 | A | * | 1/1962 | Fischer | 507/138 |
| 3,044,959 | A | * | 7/1962 | Martin | 507/263 |
| 3,125,517 | A | | 3/1964 | Voda et al. | 252/8.5 |
| 3,150,085 | A | * | 9/1964 | Mallory | 507/116 |
| 3,282,843 | A | * | 11/1966 | Alburger | 508/580 |
| 3,528,914 | A | * | 9/1970 | Darley | 507/107 |
| 3,826,771 | A | | 7/1974 | Anderson et al. | 260/39.6 H |
| 3,946,994 | A | | 3/1976 | Mertz et al. | 259/7 |
| 4,011,908 | A | * | 3/1977 | Holm | 166/270.1 |
| 4,018,426 | A | | 4/1977 | Mertz et al. | 259/7 |
| 4,033,784 | A | | 7/1977 | Lawson et al. | 134/20 |
| 4,068,676 | A | | 1/1978 | Thorn et al. | 137/13 |

(Continued)

FOREIGN PATENT DOCUMENTS

EP 0 137 538 B1 3/1990

OTHER PUBLICATIONS

JPO Abstract of JP 360179485 A; "Water-Swellable Waterstopping Material"; Miyayama et al.; Sep. 13, 1985.*

(Continued)

*Primary Examiner*—Randy Gulakowski
*Assistant Examiner*—John J Figueroa
(74) *Attorney, Agent, or Firm*—Craig W. Roddy; Baker Botts, LLP (57) ABSTRACT

In one embodiment, the present invention provides a drilling fluid composition that comprises a surfactant-free emulsion comprising an oleaginous fluid, a fluid that is at least partially immiscible with the oleaginous fluid, and emulsion facilitating particles. In another embodiment, the present invention provides a method of treating a subterranean formation comprising providing a treatment fluid that comprises a surfactant-free emulsion, the surfactant-free emulsion comprising an oleaginous fluid, a fluid that is at least partially immiscible with the oleaginous fluid, and emulsion facilitating particles; and treating the subterranean formation.

44 Claims, 2 Drawing Sheets

U.S. PATENT DOCUMENTS

| | | | |
|---|---|---|---|
| 4,107,057 A | 8/1978 | Dill et al. ................. | 252/8.55 C |
| 4,108,681 A | 8/1978 | Lawson et al. ................. | 134/20 |
| 4,108,779 A * | 8/1978 | Carney ........................ | 507/108 |
| 4,172,066 A * | 10/1979 | Zweigle et al. .............. | 523/223 |
| 4,392,917 A | 7/1983 | Lipowski et al. .......... | 162/168.1 |
| 4,460,483 A | 7/1984 | Weaver .................. | 252/8.55 R |
| 4,480,696 A | 11/1984 | Almond et al. ............. | 166/308 |
| 4,502,963 A | 3/1985 | Harmon .................... | 252/8.5 P |
| 4,519,455 A | 5/1985 | Holtmyer et al. ......... | 166/305 R |
| 4,554,082 A | 11/1985 | Holymyer et al. ....... | 252/8.55 R |
| 4,582,543 A | 4/1986 | Bretz .................... | 148/6.15 R |
| 4,615,813 A | 10/1986 | Bretz ........................ | 252/8.514 |
| RE32,302 E | 12/1986 | Almond et al. ............. | 166/308 |
| 4,627,495 A | 12/1986 | Harris et al. ................ | 166/280 |
| 4,652,606 A * | 3/1987 | Slingerland ................ | 525/54.2 |
| 4,659,486 A | 4/1987 | Harmon ....................... | 252/8.5 |
| 4,670,550 A | 6/1987 | Bleeker et al. ............. | 536/114 |
| 4,727,097 A * | 2/1988 | Kobayashi et al. .......... | 523/408 |
| 4,735,987 A * | 4/1988 | Morita et al. ............... | 524/436 |
| 4,772,646 A | 9/1988 | Harms et al. .................. | 524/27 |
| 4,806,578 A * | 2/1989 | Kobayashi et al. .......... | 523/402 |
| 4,826,880 A * | 5/1989 | Lesniak et al. ................ | 521/53 |
| H837 H | 11/1990 | Peiffer et al. ............. | 252/8.511 |
| 5,021,170 A | 6/1991 | Shumate et al. .......... | 252/8.515 |
| 5,057,234 A * | 10/1991 | Bland et al. .................. | 507/128 |
| 5,194,422 A | 3/1993 | Mueller et al. .............. | 507/136 |
| 5,232,910 A | 8/1993 | Mueller et al. .............. | 507/139 |
| 5,252,554 A | 10/1993 | Mueller et al. .............. | 507/138 |
| 5,254,531 A | 10/1993 | Mueller et al. .............. | 507/131 |
| 5,294,353 A | 3/1994 | Dill ........................ | 252/8.553 |
| 5,318,956 A | 6/1994 | Mueller et al. .............. | 507/139 |
| 5,427,699 A | 6/1995 | Pauls et al. .................. | 507/244 |
| 5,476,543 A * | 12/1995 | Ryan .......................... | 106/487 |
| 5,489,394 A | 2/1996 | Ford et al. .................. | 252/162 |
| 5,494,120 A | 2/1996 | Hale et al. ..................... | 175/72 |
| H1611 H * | 11/1996 | Patel .......................... | 507/103 |
| 5,697,458 A * | 12/1997 | Carney ........................ | 175/65 |
| 5,830,483 A | 11/1998 | Seidel et al. ................ | 424/401 |
| RE36,066 E | 1/1999 | Mueller et al. .............. | 507/138 |
| 5,869,434 A | 2/1999 | Mueller et al. .............. | 507/110 |
| 5,909,774 A | 6/1999 | Griffith et al. ............... | 166/312 |
| 5,939,081 A | 8/1999 | Ansmann et al. ............ | 424/401 |
| 5,942,468 A * | 8/1999 | Dobson et al. .............. | 507/136 |
| 5,990,050 A * | 11/1999 | Patel .......................... | 507/136 |
| 6,107,358 A * | 8/2000 | Harada et al. ................ | 521/133 |
| 6,218,342 B1 | 4/2001 | Patel .......................... | 507/129 |
| 6,268,406 B1 | 7/2001 | Chatterji et al. ............. | 523/130 |
| 6,315,042 B1 | 11/2001 | Griffith et al. ............... | 166/291 |
| 6,410,035 B1 | 6/2002 | Gers-Barlag et al. ........ | 424/404 |
| 6,422,325 B1 | 7/2002 | Krieger ........................ | 175/50 |
| 6,524,384 B2 | 2/2003 | Griffith et al. ............... | 106/705 |
| 6,596,670 B1 | 7/2003 | Mueller et al. .............. | 507/136 |
| 6,608,006 B2 | 8/2003 | Taylor et al. ................. | 507/131 |
| 6,620,770 B1 | 9/2003 | Kirsner et al. ............... | 507/131 |
| 6,645,712 B1 | 11/2003 | Olijve et al. ................. | 430/543 |
| 6,662,871 B2 | 12/2003 | Kercheville et al. ....... | 166/255.1 |
| 6,666,268 B2 | 12/2003 | Griffith et al. ............... | 166/292 |
| 6,668,929 B2 | 12/2003 | Griffith et al. ............... | 166/292 |
| 6,691,805 B2 | 2/2004 | Thaemlitz .................... | 175/65 |
| 6,822,039 B1 | 11/2004 | Monfreux-Gaillard et al. | |
| 7,026,272 B2 * | 4/2006 | Reddy et al. ................ | 507/237 |
| 7,262,152 B2 | 8/2007 | Monfreux-Gaillard et al. | |
| 2001/0009890 A1 | 7/2001 | Patel et al. .................. | 507/138 |
| 2001/0051593 A1 | 12/2001 | Patel .......................... | 507/129 |
| 2002/0033258 A1 | 3/2002 | Patel .......................... | 166/278 |
| 2002/0125013 A1 | 9/2002 | Kercheville et al. ......... | 166/301 |
| 2002/0148609 A1 | 10/2002 | Kercheville et al. ...... | 166/255.1 |
| 2003/0075360 A1 | 4/2003 | Patel et al. ..................... | 175/50 |
| 2003/0114316 A1 | 6/2003 | Patel et al. ................... | 507/138 |
| 2004/0043905 A1 | 3/2004 | Miller et al. ................ | 507/100 |

OTHER PUBLICATIONS

Paper entitled "Chalk Emulsion: A New Completion and Workover Fluid" By H.C.H. Darley, Jul. 1972.
SPE 77497 entitled "Crude Oil Emulsions: A State-Of-The Art Review" By Sunil Kokal, dated Oct. 2002.
Paper entitled "Factors Controlling the Stability of Colloid-Stabilized Emulsions" by David E. Tambe et al., Journal of Colloid and Interface Science, dated Jul. 1993.
Paper entitled "Factors Controlling the Stability of Colloid-Stabilizing Emulsions" by David E. Tambe et al., Journal of Colloid and Interface Science, dated Oct. 1994.
Paper entitled "A Study of the Formation of Water-In-Oil Emulsions" By Mark Bobra.
Paper entitled "Oil Well Drilling Fluids", pp. 320-324.
Paper entitled "Droplet-Droplet Interactions in Both Direct and Inverse Emulsions Stabilized by a Balanced Amphiphilic Polyelectrolyte," by Patrick Perrin, dated Nov. 1999.
Paper entitled "Amphiphilic Copolymers: A New Route To Prepare Ordered Monodisperse Emulsions" by P. Perrin, dated Jul. 1998.
Paper entitled "Shear-Induced Formation of Ordered Monodisperse Emulsions Stabilized by an Associating Amphipilic Polyelectrolyte" by Patrick Perrin et al., dated Jan. 2001.
Paper entitled "Rheological Behavior of Highly Concentrated Oil-in-Water (o/w) Emulsions" by R. Pons et al., dated Mar. 1995.
Paper entitled "UV-Visible Light: A Novel Route to Tune the Type of an Emulsion" by Iolanda Porcar et al., dated Jul. 2001.
Office Action Dated Jun. 16, 2006 From U.S. Appl. No. 10/829,484.
Office Action from U.S. Appl. No. 10/829,484 dated Apr. 2, 2007.
Wacker brochure entitled *The Rheological Additive for the Resin Industry, Relationships and Effects*, 1999.
Wacker brochure entitled *Products and Applications, Wacker HDK® Fumed Silica*, 2000.
Wacker brochure entitled *Foam-Control Systems, Wacker Silicones for the Petrochemical Industry*, 1995.
Wacker brochure entitled *Wacker Foam-Control Systems for the Petroleum Industry, Application: Gas Sweetening*, 1999.
Wacker brochure entilted *Wacker HDK® Fumed Silica,, Thickening and Thixotropy—Reinforcement—Free Flow*, 1998.
Wacker brochure entilted *Wacker Silicone Fluids AK*, 2000.
Office Action in U.S. Appl. No. 10/829,484, Dec. 12, 2007.
Mike McFadyen, et al., "New Synthetic Fluid System Provides Stable cold-Temperature Rheologies," WorldOil Magazine-online magazine article, Jun. 2002, vol. 223.
PetroFree Produce Brochure, Baroid Drilling Fluids, 1992.
Halliburton Press Release of Aug. 21, 2000 entitled "Halliburton Energy Services Participates in Drilling World record Inclination Well," http/www.halliburton.com/news/archiv.
Material Safety Data Sheet on EXP 3833, Alco Chemical, Apr. 12, 2000.
ALCOGUM SL-117 Product Data Sheet, Alco Chemical, Jan. 1, 2003.
ALCOGUM SL-920 Product Data Sheet, Alco Chemical Jul. 15, 2004.
ALCOGUM L-344 Product Data Sheet, Alco Chemical Mar. 25, 2004.
ALCOSPERSE 747 Product data Sheet, Alco Chemical, Mar. 15, 2002.
ALCOQUEST 747 Product Data Sheet, Alco Chemical, Sep. 18, 2002.
NOVAMUL Product Data Sheet, M-1 Dilling Fluids LLC, 1997.

* cited by examiner

SURFACTANT-FREE EMULSIONS AND METHODS OF USE THEREOF

BACKGROUND OF THE INVENTION

The present invention relates to improved emulsions and methods of using such emulsions. More particularly, the present invention relates to surfactant-free emulsions and their use in subterranean applications.

Emulsions usually comprise two immiscible phases. The two immiscible phases include a continuous (or external) phase and a discontinuous (or internal) phase. The discontinuous phase comprises the secondary fluid that usually exists in droplets in the continuous phase. Two varieties of emulsions are oil-in-water and water-in-oil. Oil-in-water emulsions usually include a fluid at least partially immiscible in an oleaginous fluid (usually an aqueous-based fluid) as the continuous phase and an oleaginous fluid as the discontinuous phase. Water-in-oil emulsions are the opposite, having the oleaginous fluid as the continuous phase and a fluid at least partially immiscible in the oleaginous fluid (usually an aqueous-based fluid) as the discontinuous phase. Water-in-oil emulsions may be also referred to as invert emulsions.

Such emulsions have been used widely in oil and gas applications. For instance, emulsions may be used in the oil and gas industry for subterranean treatment applications, including drilling, production, and completion operations. Invert emulsions may be used because oleaginous-based treatment fluids (also known as muds) may have superior performance characteristics when compared with water-based muds in some situations, e.g., when there is an abundance of water reactive materials in a well bore. These superior performance characteristics may include, e.g., better lubrication of the drilling strings and downhole tools, thinner filter cake formation, and better hole stability. An emulsification of water-in-oil, without having any emulsifying agent capable of stabilizing the fluid that is at least partially immiscible in the oleaginous fluid typically will undergo natural degradation processes including droplet coalescence and Ostwald ripening, until the two phases which are at least partially immiscible separate and the emulsion no longer exists. Having an unstable invert emulsion may be problematic because if the emulsion destabilizes, it may not have consistent, reliable properties. This problem may be exacerbated by the physical forces that the emulsion may undergo when being used in subterranean applications, such as thermal, mechanical, and chemical stresses. Emulsion stabilizing agents, sometimes referred to as emulsifiers, may be useful in invert emulsions to stabilize the emulsions, especially when used in subterranean applications.

Some traditional emulsion stabilizing agents are surfactant-based. Surfactant-based emulsion stabilizing agents usually comprise a hydrophobic part that is attracted to the oil phase and a hydrophilic part that is attracted to the water phase. Generally, the hydrophobic part interacts with the oil and the hydrophilic part interacts with the nonoleaginous fluid. These interactions generally decrease the surface tension of the interface between the water droplet and the oil, which may slow the natural tendency of the two immiscible phases to separate.

However, surfactant-based emulsion stabilizing agents may be problematic, as they may suffer from problems that include toxicity, limited range of oil to water ratios, thermal destabilization propensity for droplet coalescence, and intolerance to various salts and other chemical agents. The toxicity of the surfactants can create potential dangers for those using them and the environment. Further, a surfactant is typically capable of stabilizing either an oil-in-water emulsion or a water-in-oil emulsion, but not both. Because of the necessity to carefully balance the chemical interactions of the surfactant to the type of micelle formed, typical surfactants generally can be used only with a limited oil to water ratio range. Surfactants also may have adverse effects on shrimp and other aqueous species, along with poor biodegradability. Traditional surfactant-based emulsion agents also may have a propensity for droplet coalescence, which may be undesirable. Surfactant-based agents typically form a meta-stable structure around the micelle because they diffuse in and out of the micelles. This meta-stable structure promotes such forces as coalescence, which may result in phase separation and eventual emulsion instability. Lastly, traditional surfactant-based stabilizing agents may be intolerant to salts and various other chemical agents.

SUMMARY OF THE INVENTION

The present invention relates to improved emulsions and methods of using such emulsions. More particularly, the present invention relates to surfactant-free emulsions and their use in subterranean applications.

In one embodiment, the present invention provides a method of treating a subterranean formation comprising providing a treatment fluid that comprises a surfactant-free emulsion, the surfactant-free emulsion comprising an oleaginous fluid, a fluid that is at least partially immiscible with the oleaginous fluid, and emulsion facilitating particles; and treating the subterranean formation.

In another embodiment, the present invention provides a method of drilling a well bore in a subterranean formation using a surfactant-free emulsion drilling fluid comprising an oleaginous fluid, a fluid that is at least partially immiscible with the oleaginous fluid, and emulsion facilitating particles.

In an embodiment, the present invention provides a method of emulsifying crude oil comprising providing crude oil, a fluid that is at least partially immiscible with the crude oil and emulsion facilitating particles; and mixing the crude oil, the fluid that is at least partially immiscible with the crude oil, and the emulsion facilitating particles so as to form a surfactant-free crude oil emulsion.

In another embodiment, the present invention provides a method of making a drilling fluid that comprises a surfactant-free emulsion comprising mixing an oleaginous fluid, a fluid that is at least partially immiscible with the oleaginous fluid, and emulsion facilitating particles so as to form a surfactant-free emulsion.

In one embodiment, the present invention provides a method of fracturing a subterranean formation comprising providing a surfactant-free emulsion composition comprising an oleaginous fluid, a fluid that is at least partially immiscible with the oleaginous fluid, emulsion facilitating particles, and a portion of proppant particulates; placing the surfactant-free emulsion composition into the subterranean formation at a pressure sufficient to create or enhance at least one fracture therein; and removing the surfactant-free emulsion composition from the subterranean formation while leaving at least a portion of the proppant particulates in the fracture.

In an embodiment, the present invention provides a method of installing a gravel pack comprising providing a gravel pack surfactant-free emulsion composition comprising a an oleaginous fluid, a fluid that is at least partially immiscible with the oleaginous fluid, emulsion facilitating particles, and a portion of gravel particulates; and introducing the composition to a well bore penetrating a subterranean formation so that the gravel particulates form a gravel pack substantially adjacent to a desired location in the well bore.

In another embodiment, the present invention provides a drilling fluid composition that comprises a surfactant-free emulsion comprising an oleaginous fluid, a fluid that is at least partially immiscible with the oleaginous fluid, and emulsion facilitating particles.

In an embodiment, the present invention provides a treatment fluid comprising a surfactant-free emulsion, wherein the surfactant-free emulsion comprises an oleaginous fluid, a fluid that is at least partially immiscible with the oleaginous fluid, and emulsion facilitating particles.

The features and advantages of the present invention will be readily apparent to those skilled in the art upon a reading of the description of the preferred embodiments which follows.

BRIEF DESCRIPTION OF THE DRAWINGS

A more complete understanding of the present embodiments and advantages thereof may be acquired by referring to the following description taken in conjunction with the accompanying schematics, in which like reference numbers indicate like features, and wherein.

While the present invention is susceptible to various modifications and alternative forms, specific exemplary embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DESCRIPTION OF PREFERRED EMBODIMENTS

The present invention relates to improved emulsions and methods of using such emulsions. More particularly, the present invention relates to surfactant-free emulsions and their use in subterranean applications.

The present invention provides surfactant-free emulsions for use in any application in which an emulsion may be suitable. The surfactant-free emulsions of the present invention may avoid many problems associated with traditional emulsions, inter alia, because of their improved stability that may result from the fluid contact angles of the emulsion facilitating particles and the ability of the emulsion facilitating particles to form structured droplets in the emulsion. Also, these emulsions generally are not affected by various salts, which may be beneficial in certain environments. An aspect of the present invention includes the ability to emulsify and stabilize fluids comprising brines. Because embodiments of the present invention do not use surfactants, they do not pose the same potential environmental risks often associated with traditional surfactant-based emulsions.

The surfactant-free emulsion compositions of the present invention generally comprise an oleaginous fluid, a fluid that is at least partially immiscible with the oleaginous fluid, and emulsion facilitating particles. The surfactant-free emulsion compositions of the present invention may be suitable for use in a variety of applications wherein oil-in-water or a water-in-oil emulsions are suitable. These may include subterranean applications comprising stimulation operations such as fracturing and sand control treatments such as installing a gravel pack. These may also include drilling operations. One of ordinary skill in the art, with the benefit of this disclosure, will recognize other suitable uses for these surfactant-free emulsion compositions.

The oleaginous fluid utilized in the emulsion compositions of the present invention may comprise any traditional oil-based fluids suitable for use in emulsions. The oleaginous fluid may be from a natural or synthetic source. Examples of suitable oleaginous fluids include diesel oils, crude oils, paraffin oils, mineral oils, low toxicity mineral oils, olefins, esters, amides, amines, synthetic oils such as polyolefins, polydiorganosiloxanes, siloxanes, organosiloxanes and combinations thereof, ethers, acetals, dialkylcarbonates, hydrocarbons and combinations thereof. Examples of suitable oleaginous fluids include those commercially available from Halliburton Energy Services, Inc., in Duncan, Okla. under the tradenames "ACCOLADETM™," an internal olefin and ester blend invert emulsion base fluid, "PETROFREE®," an ester based invert emulsion base fluid, "PETROFREE®LV," an ester based invert emulsion base fluid, and "PETROFREE® S.F.," an internal olefin based invert emulsion base fluid. Factors that determine what oleaginous fluid will be used in a particular application, include but are not limited to, cost and performance characteristics of the oleaginous fluid. An additional factor that may be considered is the polarity of the oleaginous fluid. For example, diesel oils are generally more polar than paraffin oils. Other factors that may be considered are environmental compatibility and regional drilling practices. For example, in North Sea applications, an ester or internal olefin (IO) may be preferred. In the Gulf of Mexico, applications may prefer to utilize "ACCOLADE™" or a low toxicity mineral oil. One skilled in the art with the benefit of this disclosure will be able to choose a suitable oleaginous fluid for a particular application in view of these considerations. In certain exemplary embodiments of the present invention, the oleaginous fluid may be crude oil.

The emulsion compositions of the present invention also comprise a fluid that is at least partially immiscible in the oleaginous fluid. This partially immiscible fluid is a non-oleaginous fluid that is mutually insoluble with the chosen oleaginous fluid. Suitable examples of partially immiscible fluids include aqueous-based fluids, glycerin, glycols, polyglycol amines, polyols, derivatives thereof that are partially immiscible in the oleaginous fluid, and combinations thereof. Aqueous-based fluids may include, but are not limited to, fresh water, sea water, salt water, and brines (e.g., saturated salt waters). Suitable brines may include heavy brines. Heavy brines, for the purposes of this application, include brines that may be used to weight up a fluid, such as a treatment fluid, instead of using traditional weighting agents. Brines may comprise $H_2O$ soluble salts. In certain exemplary embodiments, suitable $H_2O$ soluble salts may comprise sodium chloride, calcium chloride, calcium bromide, zinc bromide, potassium carbonate, sodium formate, potassium formate, sodium acetate, potassium acetate, calcium acetate, ammonium acetate, ammonium chloride, ammonium bromide, sodium nitrate, potassium nitrate, ammonium nitrate, calcium nitrate, sodium carbonate, potassium carbonate, and combinations thereof. In other exemplary embodiments, the $H_2O$ soluble salt may be any salt which reduces the water phase activity of the emulsion. Factors that determine what partially immiscible fluid will be used in a particular application include cost, availability, and which oleaginous fluid has been chosen. Another factor that may be considered is the application of the emulsion. For example, if the application needs an emulsion with a heavy weight, a zinc bromide brine may be chosen. One skilled in the art with the benefit of this disclosure in view of the considerations will be able to choose a particularly suitable partially immiscible fluid for a particular application.

Figure 1A:
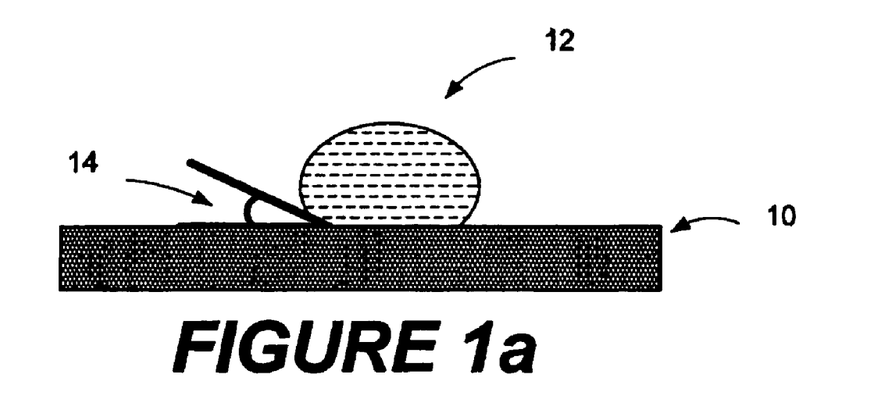
FIGS. 1A-C illustrate exemplary fluid contact angles.
Figure 1B:
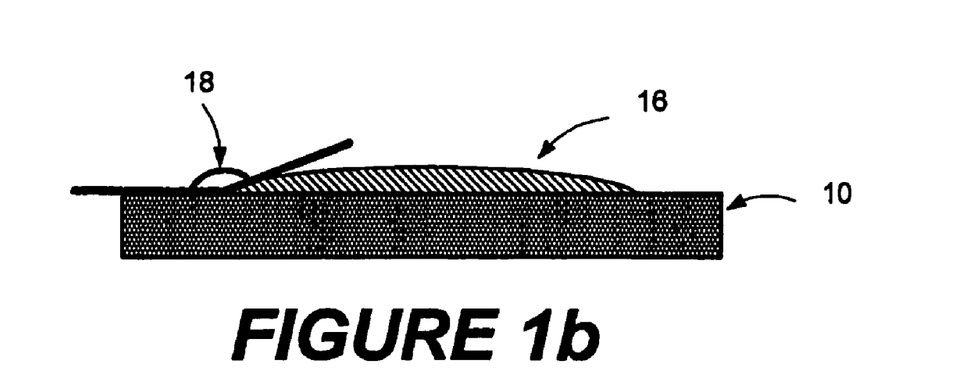
Figure 1C:
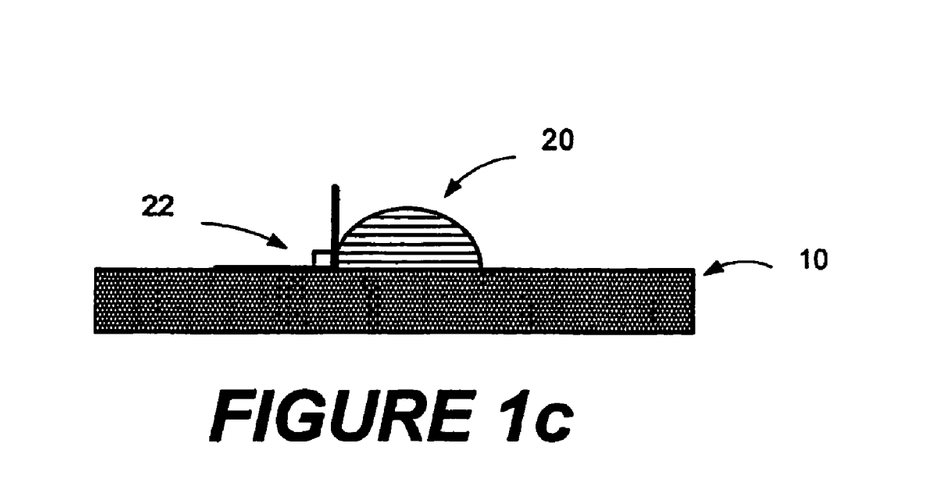

The emulsion compositions of the present invention further comprise emulsion facilitating particles. Emulsion facilitating particles comprise any material with suitable fluid contact angles. The term "fluid contact angle" refers to the angle that a droplet of a given fluid makes with the surface of an emulsion facilitating particle. The fluid contact angle of a material is not dependent on the shape or size of the emulsion facilitating particle. FIGS. 1A-C illustrate three exemplary embodiments of fluid contact angles. In FIG. 1A, solid 10 generally represents the surface of the emulsion facilitating particle. Fluid 12 rests on solid 10. Angle 14 created by fluid 12 on solid 10 represents the fluid contact angle. In FIG. 1A, fluid 12 may be a fluid with a high surface tension. FIG. 1B illustrates an embodiment with fluid 16 on solid 10 with a fluid contact angle 18. Here, fluid 16 has a low surface tension and readily spreads on solid 10. In most embodiments, the more chemically similar are fluid 16 and solid 10, the lower the surface tension and the larger the contact angle. Factors such as polarity, hydrogen bonding, and chemical similarity may affect the fluid contact angle. FIG. 1C illustrates an exemplary embodiment of fluid 20 that has fluid contact angle 22 that is nearly 90° on solid 10. In certain exemplary embodiments of the present invention, the emulsion facilitating particles have fluid contact angles that are nearly equal for both fluids of the emulsion, i.e., the oleaginous fluid and the fluid that is immiscible in the oleaginous fluid. In other exemplary embodiments, the emulsion facilitating particles have fluid contact angles that are nearly 90° for both fluids of the emulsion. In certain exemplary embodiments of the present invention, the emulsion facilitating particles have fluid contact angles that are in the range of from about 70° to about 140°. In certain exemplary embodiments of the present invention, the emulsion facilitating particles have a first fluid contact angle for the continuous phase and a second fluid contact angle for the discontinuous phase. In other exemplary embodiments, the first fluid contact angle for the continuous phase is about equal to the second fluid contact angle for the discontinuous phase. In certain exemplary embodiments of the present invention, the first fluid contact angle for the continuous phase is greater than the second fluid contact angle for the discontinuous phase.

In certain embodiments, the emulsion facilitating particles used in the emulsions of the present invention comprise any particle with a size smaller than a discontinuous phase droplet in the emulsion. In some exemplary embodiments, the emulsion facilitating particles have a size less than about 75 microns. Generally, smaller emulsion facilitating particles are preferred. Suitable examples of emulsion facilitating particles include particles that have or exhibit a suitable fluid contact angle, such as any organically modified material, metal sulfate, or polymer. Suitable organically modified materials may include modified silicas, modified fumed silicas, or various clay types. Fumed silicas will have slightly different degree of organic modification when small amounts of dimethyldichlorosilane are added in the process of fuming the silica. Examples of suitable modified silicas or modified fumed silicas include those commercially available from Wacker-Chemie GmbH, in Munich, Germany under the tradenames "H20," "H30," and "H2000" ("Wacker Silicas"). The Wacker Silicas are loose white powders that are primarily amorphous lattice structures of $SiO_2$. H20 has a surface area of about 170± about 30 meter$^2$/gram, a pH from about 3.8 to about 4.8, and an organic surface modification of —OSi$(CH_3)_2$—. H30 has a surface area of about 250± about 30 meter$^2$/gram, a pH from about 3.8 to about 4.5, and an organic surface modification of —OSi$(CH_3)_2$—. H2000 has a surface area of about 140± about 30 meter$^2$/gram, a pH from about 6.5 to about 8.0, and an organic surface modification of —OSi$(CH_3)_3$—. Between H20, H30 and H2000, H20 has the least organic modification and H2000 has the most organic modification. Therefore, the H2000 may have a greater preference for polar oleaginous fluids and may be a better emulsion facilitating particle for oleaginous fluids with higher polarities, such as diesel oil. H20 has the least organic modification, which may be better for less polar oleaginous fluids such as paraffin oils. Suitable organically modified materials also may include organically modified aluminum, titanium, zirconium, or various clay types. Various clay types may include non-kaolinitic clays such as bentonite, kaolin clays, and any other clay types capable of cation exchange.

The emulsion facilitating particles may include metal sulfates. Suitable metal sulfates may include iron sulfate, copper sulfate, derivatives thereof, or combinations thereof. An example of a suitable commercially available metal sulfate includes iron sulfate commercially available from suppliers such as Sigma—Aldrich Corp., in St. Louis, Mo. Using metal sulfates may be advantageous because of their cost, ease of handling, and higher weight which may allow for a heavier emulsion.

In certain exemplary embodiments of the present invention, the emulsion facilitating particles may comprise polymers or combinations of polymers. Suitable polymers include, but are not limited to, homopolymers, copolymers, terpolymers, and hydrophobically modified copolymers. Examples of suitable commercially available polymers includes "ALCOSPERSE® 747" (a hydrophobically-modified acrylic styrene copolymer) and "ALCOQUEST® 747" (a hydrophobically-modified acrylic copolymer) available from Alco-Chemical, a group of Imperial Chemical Industries PLC, in Chattanooga, Tenn. Polymers may be advantageous because of their availability, cost, and ease of handling.

Upon mixing the oleaginous fluid, the fluid that is at least partially immiscible with the oleaginous fluid, and the emulsion facilitating particles a surfactant-free emulsion is formed. An advantage of the surfactant-free emulsions of the present invention includes the ability to form an emulsion off-site, store the emulsion for a chosen length of time, and then transport the emulsion to the work-site with an acceptable amount of minimal loss in emulsion characteristics.

Figure 2A:
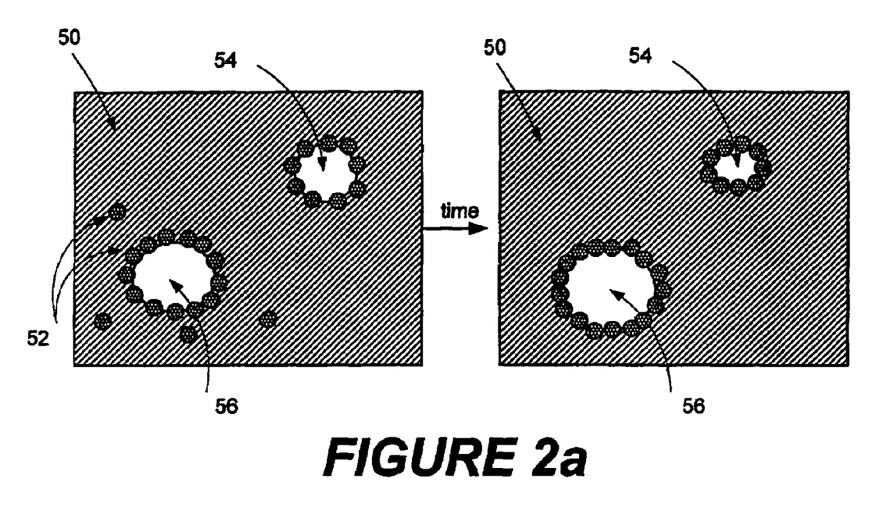
FIGS. 2A-B illustrate exemplary emulsion facilitation particles forming stabilized droplet structures and how possible interactions between the stabilized emulsion droplets may slow coalescence and Ostwald ripening.
Figure 2B:
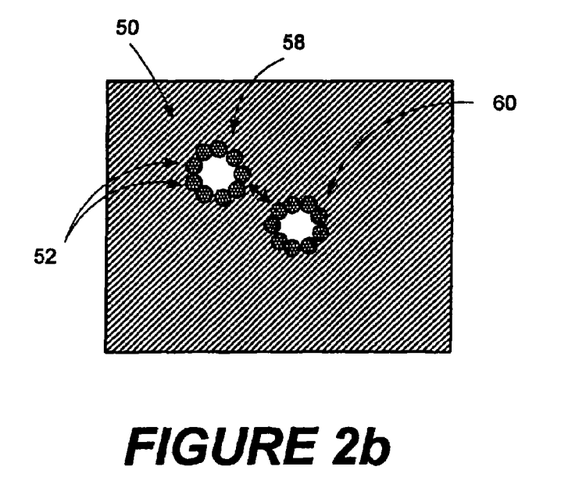

FIG. 2A illustrates an embodiment that depicts how emulsion facilitating particles 52 might form stabilized droplet structures. It should be noted that although FIGS. 2A-B represent emulsion facilitating particles 52 as spherical, particles 52 may be any suitable shape. FIGS. 2A-B, therefore, should not be read to improperly limit the scope of the emulsion facilitating particles suitable for use in the present invention. In oleaginous fluid 50, discontinuous phase droplets 54 and 56 are present. Discontinuous phase droplets 54 and 56 are formed of a fluid that is at least partially immiscible with the oleaginous fluid. Emulsion facilitating particles 52, because of their suitable fluid contact angles, are absorbed at the interface between oleaginous fluid 52 and discontinuous phase droplets 54 and 56. As a result, particles 52 tend to surround droplets 54 and 56. As time progresses, droplets 54 and 56 may shrink, grow, or stay the same size until droplets 54 and 56 are surrounded by a shell of emulsion facilitating particles 52. Whether droplets 54 and 56 grow or shrink may depend on the size or concentration of emulsion facilitating particles 52 and the volumes of the continuous and discontinuous fluids. These shells around droplets 54 and 56 result from the chemical interactions of the fluid contact angles of particles 52. FIG. 2B illustrates the possible interactions between the droplet structures. Stabilized emulsion droplets 58 and 60 have a tendency to repulse one another. This may be because the emulsion facilitating particles 52, once situated at an interface, may have a tendency to repulse one another by steric interaction. This may lead to less interactions between the stabilized emulsion droplets 58 and 60, and therefore, possibly less coalescence.

In certain embodiments, a surfactant-free emulsion of the present invention may be an emulsified brine. An advantage of such embodiments is the ability to emulsify a wide variety of brines and brine concentrations with the same emulsion facilitating particles. The emulsified brine composition may comprise a heavy brine, including a zinc bromide brine. In other exemplary embodiments of the present invention, the brine may comprise any $H_2O$ soluble salt; examples of such suitable brines may comprise sodium chloride, calcium chloride, calcium bromide, zinc bromide, or potassium carbonate. One skilled in the art with the benefit of this disclosure will recognize other suitable brines for use with this invention.

Other types of emulsion additives optionally may be added to the emulsion compositions of the present invention including, but not limited to, weighting agents, wetting agents, fluid loss agents, viscosifying agents, thinning agents, lubricants, anti-oxidants, surfactants that are suitable for a purpose other than stabilizing an emulsion, corrosion inhibitors, scale inhibitors, and the like. When used in certain applications, the emulsion compositions of the present invention may include particulates such as proppant or gravel. One of ordinary skill in the art with the benefit of this disclosure will recognize the appropriate type of additive for a particular application.

In certain exemplary embodiments, the emulsions of the present invention may be included in or comprise a treatment fluid. A suitable treatment fluid also may comprise a base fluid. Suitable base fluids have desirable properties depending on the application of the treatment fluid; suitable base fluids, when used, should be compatible with the emulsion(s) being used. The treatment fluids of the present invention may be used in applications including treating subterranean formations. Treating subterranean formations may involve drilling a well-bore, completing a well, stimulation a subterranean formation with treatments such as a fracturing or an acid stimulating treatment (such as a matrix acidizing process or an acid fracturing process), or carrying out a sand control treatment (such as a gravel packing treatment). In certain exemplary embodiments of the methods of the present invention, fracturing may be accomplished by injecting a viscous fracturing fluid comprising an emulsion composition of the present invention into the subterranean formation at a rate and pressure sufficient to cause the formation to break down and produce one or more fractures. Other exemplary embodiments include sand control treatments such as gravel packing. A gravel packing operation may involve placing a gravel pack screen in the well bore and packing the surrounding annulus between the screen and the well bore with particulates often referred to as "gravel" that have a specific size chosen to prevent the passage of formation sand by using a gravel pack fluid comprising an emulsion composition of the present invention. One skilled in the art, with the benefit of this disclosure, will recognize other suitable uses for these treatment fluids.

Optionally, the treatment fluids of the present invention may comprise a viscosifier, proppant particulates and/or gravel particulates. A viscosifier may be present in a treatment fluid to adjust the treatment fluid to a desired viscosity. The viscosifier may comprise a polymer or mixture of polymers. Proppant particulates may comprise a filler material, inter alia, to fill voids, cavities, crevices, channels behind casing strings, or channels within the subterranean formation. Gravel particulates used in accordance with the present invention are generally filler material of a size such that formation particulates that may migrate with produced fluids are prevented from being produced from the subterranean formation.

An example of a method of the present invention is a method of treating a subterranean formation comprising the steps of providing a treatment fluid comprising a surfactant-free emulsion comprising an oleaginous fluid, a fluid that is at least partially immiscible with the oleaginous fluid, and emulsion facilitating particles; and treating the subterranean formation. In certain exemplary embodiments of the present invention, a method of treating a subterranean formation includes a well completion operation or a drilling operation. In other exemplary embodiments of the present invention, a method of treating a subterranean formation includes a stimulation operation. Examples of stimulation operations of the present invention include fracturing operations and acid stimulation operations, like matrix acidizing and a fracturing acidizing processes.

Another example of a method of the present invention is a method of drilling a well bore in a subterranean formation using a surfactant-free emulsion drilling fluid comprising an oleaginous fluid, a fluid that is at least partially immiscible with the oleaginous fluid, and emulsion facilitating particles.

An exemplary method of the present invention is a method of emulsifying crude oil comprising the steps of providing crude oil, a fluid that is at least partially immiscible with the crude oil and emulsion facilitating particles; and mixing the crude oil, the fluid that is at least partially immiscible with the crude oil and emulsion facilitating particles so as to form a surfactant-free crude oil emulsion.

Another exemplary method of the present invention is a method of making a drilling fluid that comprises a surfactant-free emulsion comprising mixing an oleaginous fluid, a fluid that is at least partially immiscible with the oleaginous fluid, and emulsion facilitating particles so as to form a surfactant-free emulsion.

A method of the present invention is a method of fracturing a subterranean formation comprising the steps of providing a surfactant-free emulsion composition comprising an oleaginous fluid, a fluid that is at least partially immiscible with the oleaginous fluid, emulsion facilitating particles, and a portion of proppant particulates; placing the surfactant-free emulsion composition into the subterranean formation at a pressure sufficient to create or enhance at least one fracture therein; and removing the surfactant-free emulsion composition from the subterranean formation while leaving at least a portion of the proppant particulates in the fracture. A breaker may be included in the compositions of the present invention if desired to reduce the viscosity of the gel at the requisite time in the process.

An example method of the present invention is a method of installing a gravel pack comprising the steps of providing a gravel pack surfactant-free emulsion composition comprising a an oleaginous fluid, a fluid that is at least partially immiscible with the oleaginous fluid, emulsion facilitating particles, and a portion of gravel particulates; and introducing the composition to a well bore penetrating a subterranean formation so that the gravel particulates form a gravel pack substantially adjacent to a desired location in the well bore.

An exemplary embodiment of the present invention is a drilling fluid composition that comprises a surfactant-free emulsions comprising an oleaginous fluid, a fluid that is at least partially immiscible with the oleaginous fluid, and emulsion facilitating particles.

Another exemplary embodiment of the present invention includes a treatment fluid comprising a surfactant-free emulsion, wherein the surfactant-free emulsion comprises an oleaginous fluid, a fluid that is at least partially immiscible with the oleaginous fluid, and emulsion facilitating particles.

Other exemplary embodiments of the present invention generally include methods for drilling, completing, stimulating, and working over a well using the emulsions of the present invention. Such methods of using emulsions in such operations should be known to one of skill in the art.

To facilitate a better understanding of the present invention, the following examples of preferred embodiments are given. In no way should the following examples be read to limit or define the scope of the invention.

EXAMPLES

Example 1

Hydrophobically modified silica was obtained from Wacker—Chemie GmbH. Three samples were sent with varying degrees of hydrophobicity generated by reaction of the silica with a methyl silating agent. The three samples obtained in order of increasing hydrophobicity were H20, H30, and H2000. Iron sulfate, obtained from Sigma-Aldrich, was also tested.

The modified fumed silica materials from Wacker-Chemie GmbH were tested first. Both the H20 and H30 particles readily formed water-in-oil emulsions when 1:1 mixtures of a base oil and fresh water were mixed with 2% by weight of emulsion facilitating particles. The base oils used were SF BASE, ACCOLADE™, and PETROFREE® LV from Halliburton Energy Services, Inc. In general, the H2000 particles failed to produce an emulsion that was stable for more than a few hours, possibly due to the affinity of the H2000 particles for the base oils. However, stable emulsions could be prepared from both H20 and H30 using either SF BASE, ACCOLADE™, or PETROFREE® LV.

Most of the emulsion compositions were readily prepared by mixing the solids with the oil first on a low shear paddle mixer. Mixing with a multi-mixer has proven to provide very stable emulsions in a short time period. In general, the emulsion compositions made with the ACCOLADE™ proved to be the most stable. The original emulsions prepared with SF BASE have proved to be exceptionally stable to coalescence, staying well emulsified after two months.

Table 1 shows electrical stability measurements of 1:1 oil-water ratio emulsions made with SF BASE oil, 2% of the Wacker-Chemie GmbH H20 or H30 emulsion facilitating particles, and either freshwater or $CaCl_2$ brine. These electrical stability measurements demonstrate the stability of these water-in-oil emulsion compositions. Similarly, Table 2 shows electrical stability measurements of H30 emulsion facilitating particles in a 6:4 oil-water ratio emulsion with two different base oils and different salt concentrations. Once again, these electrical stability readings demonstrate emulsification.

TABLE 1

Electrical stability of 1:1 oil water ratio fluids, 2 wt % emulsion facilitating particles

| | SF BASE, freshwater | SF BASE, 250000 ppm chlorides |
|---|---|---|
| H20 particles | 239 V initial/285 V 24 hrs. | 200 V initial/200 V 24 hrs. |
| H30 particles | 129 V initial/130 V 24 hrs. | 167 V initial/340 V 24 hrs. |

TABLE 2

Electrical stability of 6:4 oil water ratio fluids, 2 wt % emulsion facilitating particles

| | SF BASE w/H30 particles | ACCOLADE ™ w/H30 particles |
|---|---|---|
| Freshwater | 250 V | 1005 V |
| $CaCl_2$ 250,000 ppm $Cl^-$ | 250–500 V | 1908 V |
| $CaCl_2$ 183,000 ppm $Cl^-$ | 350 V | 1700 V |
| NaCl 183,000 ppm $Cl^-$ | 250 V | 1200 V |

Example 2

Four drilling fluids (one 9 ppg sample, two 12 ppg samples, and one 16 ppg sample) were prepared using the Wacker-Chemie GmbH solid particles as emulsion facilitating particles. The fluids were subjected to various tests including standard 150° F. 16 hour hot rolling, an additional 250° F. 16 hour hot rolling, and 250° F. high temperature, high pressure (HTHP) readings. The 9 ppg sample was prepared completely surfactant free. The 12 ppg and 16 ppg samples required a small amount of surfactant wetter in order to make the barite and drill solids more hydrophobic in nature. The formulations and properties of these fluids appear below in Tables 3-8. ADAPTA™ HP and DEEP-TREAT™ are both commercially available from Halliburton Energy Services, Inc.

TABLE 3

Mud formulations

| Sample | 9 ppg | 16 ppg |
|---|---|---|
| ACCOLADE ™, g | 187 | 135 |
| H20 emulsifier particles, g | 2 | 2.5 |
| Water, ml | 97 | 71.5 |
| $CaCl_2$, g | 33.8 | 24.8 |
| ADAPTA ™ HP, g | 2 | 4 |
| Barite, g | 57.8 | 436 |
| DEEP-TREAT ™, g | 0 | 0.75 |

TABLE 4

Mud properties

| | 9 ppg, 7:3 Oil:Water | | | 16 ppg, 7:3 Oil:Water | | | |
|---|---|---|---|---|---|---|---|
| | Initial | Hot1 | Hot2 | Initial | Static | Hot1 | Hot2 |
| Rolled, 150° F., hr | 0 | 16 | 32 | 0 | 0 | 16 | 32 |
| Stirred, min | 20 | 2 | 2 | 30 | 2 | 5 | 5 |
| Temperature, ° F. | 120 | 120 | 120 | 120 | 120 | 120 | 120 |

TABLE 4-continued

Mud properties

| | 9 ppg, 7:3 Oil:Water | | | 16 ppg, 7:3 Oil:Water | | | |
|---|---|---|---|---|---|---|---|
| | Initial | Hot1 | Hot2 | Initial | Static | Hot1 | Hot2 |
| Plastic viscosity, cP | 14 | 17 | 16 | 61 | 59 | 41 | 42 |
| Yield point, lb/100 ft$^2$ | 14 | 7 | 6 | 38 | 27 | 28 | 21 |
| 10 Sec gel, lb/100 ft$^2$ | 7 | 4 | 2 | 12 | 11 | 7 | 6 |
| 10 Min gel, lb/100 ft$^2$ | 11 | 5 | 2 | 17 | 14 | 8 | 7 |
| Electrical stability, v | 544 | — | — | — | 111 | 150 | 100 |
| HTHP, 250° F. | | | | | | | <1 ml |

TABLE 5

Viscosity Data

| | Sample | | | | | | |
|---|---|---|---|---|---|---|---|
| Fann 35 dial readings | 9 ppg | | | 16 ppg | | | |
| 600 rpm | 42 | 41 | 38 | 160 | 145 | 110 | 105 |
| 300 rpm | 28 | 24 | 22 | 99 | 86 | 69 | 63 |
| 200 rpm | 22 | 18 | 16 | 75 | 63 | 50 | 45 |
| 100 rpm | 15 | 11 | 9.5 | 47 | 41 | 30 | 28 |
| 6 rpm | 7.5 | 2 | 2.5 | 13 | 10.5 | 6.5 | 5 |
| 3 rpm | 7.0 | 2 | 2 | 10 | 8 | 5.0 | 4 |

TABLE 6

Mud formulations

| Sample | 12 ppg (A) | 12 ppg (B) |
|---|---|---|
| ACCOLADE ™, g | 165.5 | 165.5 |
| H20 emulsifier particles, g | 2.5 | 2.5 |
| Water, ml | 86.3 | 86.3 |
| CaCl$_2$, g | 29.9 | 29.9 |
| ADAPTA ™ HP, g | 2 | 2 |
| Barite, g | 220 | 220 |
| DEEP-TREAT ™, g | 1 | .5 |
| Lecithin concentrate, g | | 1.0 |
| | 12 ppg, 7:3 Oil:Water | 12 ppg, 7:3 Oil:Water |

TABLE 7

Mud properties

| | Initial | Hot1 | Hot2 | Hot3 | Hot1 | Hot2 | Hot3 | Hot4 |
|---|---|---|---|---|---|---|---|---|
| Rolled, 150° F., hr | 0 | 16 | 32 | 48 | 16 | 32 | 48 | 60 |
| Stirred, min | 20 | 2 | 5 | 5 | 30 | 2 | 5 | 5 |
| Temperature, ° F. | 120 | 120 | 120 | 120 | 120 | 120 | 120 | 120 |
| Plastic viscosity, cP | 18 | 19 | 19 | 17 | 20 | 18 | 20 | 21.5 |
| Yield point, lb/100 ft$^2$ | 12 | 7 | 5 | 6 | 1 | 3 | 5 | 7 |
| 10 Sec gel, lb/100 ft$^2$ | 5 | 3 | 3 | 3 | 1 | 1.5 | 2 | 3 |
| 10 Min gel, lb/100 ft$^2$ | 7 | 3 | 3 | 3 | 1 | 2 | 3 | 4 |
| Electrical stability, v | — | 143 | 85 | 117 | — | 75 | 144 | 120 |
| HTHP, 250° F., ml | | | | 7.8 | | | | 7.8 |

TABLE 8

Viscosity Data

| | Sample | | | | | | | |
|---|---|---|---|---|---|---|---|---|
| Fann 35 dial readings | 12 ppg (A) | | | | 12 ppg (B) | | | |
| 600 rpm | 48 | 45 | 43 | 40 | 41 | 39 | 45 | 50 |
| 300 rpm | 30 | 26 | 24 | 23 | 21 | 21 | 25 | 28.5 |
| 200 rpm | 23 | 18 | 17 | 17 | 15 | 14 | 17 | 20.5 |
| 100 rpm | 15 | 11 | 10 | 10 | 8 | 8 | 10 | 12 |
| 6 rpm | 4 | 2 | 2 | 2.5 | 1 | 1.5 | 2 | 2.5 |
| 3 rpm | 3 | 2 | 2 | 2 | 1 | 1.5 | 1.5 | 2 |

Example 3

Four fluids were prepared and were aged under elevated temperatures. The formulations and results of this testing appear in Tables 9 and 10. Samples 1 and 2 were prepared without a surfactant and rolled at 200° F. for 16 hours. Sample 2 had too much barite to remain completely oil wet under these conditions and eventually turned to a partially water wet stage and no reasonable rheology readings could be taken. Samples 3 and 4 were rolled at 250° F. for 16 hours. Sample 3 is surfactant-free, and sample 4 contains a very small amount of wetting agent for the barite.

TABLE 9

High temperature rolling experiments

| | Sample 1 | Sample 2 | Sample 3 | Sample 4 |
|---|---|---|---|---|
| ACCOLADE ™, g | 160.8 | 165 | 186 | 165 |
| Water, ml | 130 | 86.3 | 97.4 | 86.3 |
| CaCl$_2$, g | 45 | 29.9 | 33.8 | 29.9 |
| ADAPTA ™ HP, g | 2.0 | 2.5 | 2.5 | 2.5 |
| H20 Emulsifier, g | 2.0 | | 2.5 | |
| H30 Emulsifier, g | | 2.5 | | 2.5 |
| DEEP-TREAT ™, g | 0 | 0 | 0 | 0.7 |
| Barite, g | 54 | 200 | 54 | 220 |
| Fluid weight, lb/gal | 9.4 | 12 | 9 | 12 |
| Oil water ratio | 6:4 | 7:3 | 7:3 | 7:3 |
| Rolling Time, hours | 16 | 16 | 16 | 16 |
| Rolling Temp, ° F. | 200 | 200 | 250 | 250 |

TABLE 10

Rheology Data

| | Sample 1 | Sample 2 | Sample 3 | Sample 4 |
|---|---|---|---|---|
| 600/300 | 50/33 | Water Wet | 42/25 | 57/32 |
| 200/100 | 27/20 | | 19/11.5 | 24/15 |
| 6/3 | 10/7 | | 2.5/2.0 | 7/6 |
| Pv | 17 | | 17 | 25 |
| Yp | 6 | | 8 | 7 |
| 10 sec/10 min gel | 7/8 | | 4/5.5 | 7/9 |
| 30 min/5 hr gel | | | 10/22 | 9/22 |

With the exception of Sample 2 which became partially water wet, the samples gave fluids with reasonable rheology that could be evaluated.

Example 4

In an attempt to prove the emulsification potential of the emulsion facilitating particles with a non-aqueous discontinuous phase, the following formulation was prepared. An emulsion was prepared by the formulation in Table 11. The sample was subjected to standard 16 hour 150° F. aging and 15 hour 250° F. aging. Initial ES was 577 volts and after extended aging, ES was over 1000 volts. GELTONE® II is commercially available from NL Industries, Inc., a subsidiary of Kronos, Inc. in Cranbury, N.J. and DRILTREAT® is commercially available from Halliburton Energy Services, Inc.

TABLE 11

Isobutyl oleate and glycerin emulsion

| Material | Quantity |
|---|---|
| Isobutyl Oleate, g | 178.8 |
| Wacker-Chemie GmbH HDK H30, g | 2 |
| GELTONE ® II, g | 4 |
| Glycerin, g | 112.5 |
| Barite, g | 214.1 |
| DRILTREAT ®, g | 1 |

Example 5

An emulsion of HT 40 base oil, supplied by Petro-Canada Lubricants, and saturated potassium carbonate brine was prepared by combining 150 ml of HT 40 base oil, 100 ml of potassium carbonate brine, and 2.0 grams of Wacker-Chemie GmbH HDK H20 silica. The mixture was mixed for 15 minutes on a multi-mixer. The resultant emulsion was moderately stable with substantial top oil separation, but no water breakout after a month of sitting.

Example 6

An emulsion of ACCOLADE™ base oil and 19.2 ppb $ZnBr_2/CaBr_2$ brine was prepared by combining 150 ml ACCOLADETM™ base oil, 150 ml of $ZnBr_2/CaBr_2$ brine and 2.0 grams of Wacker-Chemie GmbH HDK H20 silica. The mixture was mixed for 10 minutes on a multi-mixer. The resultant emulsion was moderately stable with top oil separation but no water breakout. The weight of the emulsion was quite great, which lead to compaction of the emulsion phase over time and more top oil separation but no water break out.

Example 7

In an attempt to illustrate the $CaBr_2$ brine emulsification potential of this material the following fluid formulations were prepared and compared to a known BROMI-MUL™ formulation for $CaBr_2$ brine. BROMI-MUL™ is commercially available from Halliburton Energy Services, Inc. The following three emulsions (the BROMI-MUL formulation, Sample a and Sample b) were prepared according to a process as described in the preceding paragraph.

TABLE 12

Brine emulsion formulations

| Material | BROMI-MUL ™ formulation | Sample a | Sample b |
|---|---|---|---|
| HDF-2000 base oil, bbl | 0.559 | | |
| LVT-200 base oil, bbl | | 0.559 | 0.559 |
| BROMI-MUL, lb | 14 | | |
| 14.2 lb/gal $CaBr_2$, bbl | 0.419 | 0.419 | 0.419 |
| VIS-PLUS, lb | 0.9 | | |
| Shellvis 300, lb | 0.4 | | |
| Wacker-Chemie GmbH HDK H20, lb | | 1.8 | |

TABLE 12-continued

Brine emulsion formulations

| Material | BROMI-MUL ™ formulation | Sample a | Sample b |
|---|---|---|---|
| Wacker-Chemie GmbH HDK H30, lb | | | 2.5 |

The emulsions listed under Table 12 were subjected to standard 16 hour, 150° F. hot roll aging. Samples a and b were both quite stable and provided excellent rheology. These fluids demonstrate the relative ease and efficiency of emulsifying a $CaBr_2$ brine. The current system relies on a specific BROMI-MUL™ emulsifier to emulsify this brine; a large amount of this emulsifier is required to properly emulsify the fluid. The emulsifiers of the present invention appear to be efficient at lower concentrations, and do not require added viscosifiers to achieve sufficient fluid rheology.

One method for measuring long term emulsion stability is by measuring the top oil separation, water breakout, and emulsion volume as a function of time. Top oil separation measures the amount of oil that has separated from the emulsion. Water breakout measures the amount of water that has separated from the emulsion, and emulsion volume measures the amount of emulsion remaining. Examples 8-12 were tracked for stability data for up to 6 months. The stability of emulsions relates to the storage and transportation of the emulsions.

Example 8

The first emulsion composition tracked for long term stability data was prepared with a 1:1 Oil Water Ratio (OWR). The emulsion mixture included 50 ml of SF BASE oil and 50 ml of Freshwater and 2.0 grams of Wacker-Chemie GmbH HDK H30 Silica. The mixture was mixed on a paddle mixer for 20 minutes. The mixture had an initial Electrical Stability (ES) of 129V. The initial emulsified phase height in container was 3.5 centimeters (cm). After 3 months, there was 0.2 cm of top oil separation and 3.3 cm of emulsified phase with no water breakout. After 6 months, there was 0.4 cm of top oil separation and 3.1 cm of emulsified phase with no water breakout. The emulsion appeared stable.

Example 9

The second emulsion composition tracked was prepared with a 1:1 OWR. The emulsion mixture included 50 ml of SF BASE oil and 50 ml of Freshwater and 2.0 grams of Wacker-Chemie GmbH HDK H20 Silica. The mixture was mixed on a paddle mixer for 20 minutes. The mixture had an initial ES of 239V. The initial emulsified phase height in container was 3.5 cm. After 3 months, there was 0.2 cm of top oil separation and 3.3 cm of emulsified phase with no water breakout. After 6 months, there was 0.4 cm of top oil separation and 3.1 cm of emulsified phase with no water breakout. The emulsion appeared stable.

Example 10

The 9.0 ppb drilling fluid with a 7:3 OWR was tracked for long term emulsion stability. The drilling fluid included 187 grams ACCOLADE™, 2 grams of Wacker-Chemie GmbH H20 emulsifier particle, 97 grams of water, 33.8 grams of CaCl$_2$, 2 grams ADAPTA™ HP, 57.8 grams of barite. The mixture was mixed on a multi-mixer for 30 minutes, followed by a standard 16 hour, 150° F. hot roll aging. The initial ES was 544V. The initial emulsified fraction height was approximately 6.5 cm with 2.5 cm of top oil separation and no water breakout. After 3 months, little change has been noted with the emulsion volume being approximately the same and no evidence of water breakout. The emulsion appeared stable.

Example 11

A 6:4 OWR emulsion composition was prepared and tracked for long term stability data. The emulsion mixture included 60 ml of SF BASE oil, 50 ml of CaCl$_2$ brine at 167000 ppm Cl$^-$ concentration and 2.0 grams of Wacker-Chemie GmbH HDK H30 Silica. The mixture was mixed on a multi-mixer for 10 minutes. The emulsion had an initial ES of 250V. The initial emulsified phase height in container was 3.1 cm. After 3 months, there was 0.2 cm of top oil separation and 2.9 cm of emulsified phase with no water breakout. After 6 months, there was 0.3 cm of top oil separation and 2.8 cm of emulsified phase with no water breakout. The emulsion appeared to be stable with substantial gel formation.

Example 12

An 8:2 OWR emulsion composition was prepared and tracked for long term stability data. The emulsion composition included 185 grams of ACCOLADE™ base oil, 95 ml of water, 32 grams of CaCl$_2$, and 8 grams of FeSO$_4$. The mixture was mixed on a multi-mixer for 30 minutes. The emulsion had an initial ES of 150V. The initial emulsified phase height in container was 5.6 cm with 2 cm of water breakout. After 3 months, there was no noticeable change in emulsion volume or water breakout. After 6 months, there was no noticeable change in emulsion volume or water breakout. Even though this emulsion initially forms with some water breakout, the resultant emulsion was stable over time.

Thus, the present invention is well adapted to carry out the objects and attain the ends and advantages mentioned as well as those which are inherent therein. While numerous changes may be made by those skilled in the art, such changes are encompassed within the spirit and scope of this invention as defined by the appended claims.

What is claimed is:

1. A method of treating a subterranean formation comprising:
   providing a treatment fluid that comprises a surfactant-free emulsion, the surfactant-free emulsion comprising an oleaginous fluid, a fluid that is at least partially immiscible with the oleaginous fluid, and solid emulsion facilitating particles, wherein the emulsion facilitating particles have a fluid contact angle in the range from about 70° to about 140°; and
   treating the subterranean formation.

2. The method of claim 1 wherein the emulsion facilitating particles interact with the oleaginous fluid and the fluid that is at least partially immiscible with the oleaginous fluid to at least partially stabilize the surfactant-free emulsion.

3. The method of claim 1 wherein the method of treating the subterranean formation comprises a stimulation operation.

4. The method of claim 3 wherein the stimulation operation comprises a fracturing operation.

5. The method of claim 3 wherein the stimulation operation comprises an acid stimulation treatment.

6. The method of claim 5 wherein the acid stimulation treatment comprises a matrix acidizing process or a fracture acidizing process.

7. The method of claim 1 wherein the method of treating a subterranean formation comprises completing a well.

8. The method of claim 1 wherein the method of treating a subterranean formation comprises drilling a well bore.

9. The method of claim 1 further comprising flowing back a portion of the treatment fluid from the subterranean formation.

10. The method of claim 9 wherein the treatment fluid further comprises a breaker.

11. The method of claim 1 wherein the surfactant-free emulsion comprises a continuous phase and a discontinuous phase.

12. The method of claim 11 wherein the continuous phase comprises the oleaginous fluid.

13. The method of claim 11 wherein the continuous phase comprises the fluid that is at least partially immiscible with the oleaginous fluid.

14. The method of claim 1 wherein the emulsion facilitating particles have a first fluid contact angle for the continuous phase and a second fluid contact angle for the discontinuous phase.

15. The method of claim 14 wherein the first fluid contact angle for the continuous phase is about equal to the second fluid contact angle for the discontinuous phase.

16. The method of claim 14 wherein the first fluid contact angle for the continuous phase is greater than the second fluid contact angle for the discontinuous phase.

17. The method of claim 1 wherein at least a portion of the emulsion facilitating particles are smaller than about 75 microns.

18. The method of claim 1 wherein the emulsion facilitating particles comprise any organically modified material.

19. The method of claim 18 wherein the organically modified material comprises at least one material selected from the group consisting of a silica, a fumed silica, aluminum, titanium, zirconium, and a clay.

20. The method of claim 1 wherein the emulsion facilitating particles comprise a metal sulfate.

21. The method of claim 1 wherein the emulsion facilitating particles comprise a polymer or combination of polymers.

22. The method of claim 1 wherein the oleaginous fluid comprises at least one oleaginous fluid selected from the group consisting of diesel oil, crude oil, paraffin oil, an olefin, an ester, an amide, an amine, a synthetic oil, an ether, an acetal, a dialkyl carbonate, a hydrocarbon, and any combination thereof.

23. The method of claim 1 wherein the fluid that is at least partially immiscible with the oleaginous fluid comprises at least one fluid selected from the group consisting of fresh water, sea water, salt water, and brine.

24. The method of claim 23 wherein the brine comprises a H$_2$O soluble salt.

25. The method of claim 1 wherein the fluid that is at least partially immiscible with the oleaginous fluid comprises a heavy brine.

26. The method of claim 1 wherein the fluid that is at least partially immiscible with the oleaginous fluid comprises at least one fluid selected from the group consisting of glycerin, a polyglycol amine, a glycol, a polyol, a derivative thereof, or any combination thereof.

27. The method of claim 1 wherein the treatment fluid further comprises at least one additive selected from the group consisting of proppant particulates, gravel particulates, a viscosifier, a thinner, a lubricant, an anti-oxidant, a weighting agent, an $H_2O$ soluble salt, a wetting agent, a fluid loss agent, a corrosion inhibitor, a surfactant, and a scale inhibitor.

28. A method comprising:
    drilling a well bore in a subterranean formation using a surfactant-free emulsion drilling fluid that comprises:
    an oleaginous fluid;
    a fluid that is at least partially immiscible with the oleaginous fluid; and
    emulsion facilitating particles, wherein the emulsion facilitating particles have a fluid contact angle in the range from about 70° to about 140°.

29. The method of claim 28 wherein the emulsion facilitating particles have a first fluid contact angle for the continuous phase and a second fluid contact angle for the discontinuous phase.

30. The method of claim 29 wherein the first fluid contact angle for the continuous phase is about equal to the second fluid contact angle for the discontinuous phase.

31. The method of claim 29 wherein the first fluid contact angle for the continuous phase is greater than the second fluid contact angle for the discontinuous phase.

32. The method of claim 28 wherein the emulsion facilitating particles comprise at least one material selected from the group consisting of an organically modified material, a metal sulfate, a polymer, and any combination thereof.

33. The method of claim 32 wherein the organically modified material comprises at least one material selected from the group consisting of a silica, a fumed silica, aluminum, titanium, zirconium, and a clay.

34. The method of claim 28 wherein at least a portion of the emulsion facilitating particles are smaller than about 75 microns.

35. The method of claim 28 wherein the oleaginous fluid comprises at least one oleaginous fluid selected from the group consisting of diesel oil, crude oil, paraffin oil, an olefin, an ester, an amide, an amine, a synthetic oil, an ether, an acetal, a dialkyl carbonate, a hydrocarbon, and any combination thereof.

36. The method of claim 28 wherein the fluid that is at least partially immiscible with the oleaginous fluid comprises at least one fluid selected from the group consisting of fresh water, sea water, salt water, and brine.

37. The method of claim 36 wherein the brine comprises a $H_2O$ soluble salt.

38. The method of claim 28 wherein the fluid that is at least partially immiscible with the oleaginous fluid comprises a heavy brine.

39. The method of claim 28 wherein the fluid that is at least partially immiscible with the oleaginous fluid comprises at least one fluid selected from the group consisting of glycerin, a polyglycol amine, a glycol, a polyol, any derivative thereof, and any combination thereof.

40. The method of claim 28 wherein the treatment fluid further comprises at least one additive selected from the group consisting of a viscosifier, a thinner, a lubricant, an anti-oxidant, a weighting agent, an $H_2O$ soluble salt, a wetting agent, a fluid loss agent, a corrosion inhibitor, a surfactant, or a scale inhibitor.

41. A method of fracturing a subterranean formation compromising:
    providing a surfactant-free emulsion composition comprising an oleaginous fluid, a fluid that is at least partially immiscible with the oleaginous fluid, solid emulsion facilitating particles, wherein the emulsion facilitating particles have a fluid contact angle in the range from about 70° to about 140°, and a portion of proppant particulates; and
    placing the surfactant-free emulsion composition into the subterranean formation at a pressure sufficient to create or enhance at least one fracture therein.

42. The method of claim 41 wherein the surfactant-free emulsion composition further comprises a breaker.

43. The method of claim 41 further comprising removing the surfactant-free emulsion composition from the subterranean formation while leaving at least a portion of the proppant particulates in the fracture.

44. A method of installing a gravel pack comprising:
    providing a gravel pack surfactant-free emulsion composition comprising a an oleaginous fluid, a fluid that is at least partially immiscible with the oleaginous fluid, solid emulsion facilitating particles, wherein the emulsion facilitating particles have a fluid contact angle in the range from about 70 ° to about 140°, and a portion of gravel particulates; and
    introducing the composition to a well bore penetrating a subterranean formation so that the grave particulates form a gravel pack substantially adjacent to a desired location in the well bore.

* * * * *